United States Patent [19]

Vanacore

[11] Patent Number: 5,249,223
[45] Date of Patent: Sep. 28, 1993

[54] CALL-LOAD-CONTROL ARRANGEMENT FOR AN EMERGENCY-CALL-ANSWERING CENTER

[75] Inventor: Vincent D. Vanacore, Boulder, Colo.

[73] Assignee: AT&T Bell Laboratories, Murray Hill, N.J.

[21] Appl. No.: 637,249

[22] Filed: Jan. 3, 1991

[51] Int. Cl.⁵ ..................... H04M 7/00; H04M 11/04; H04M 15/00; H04M 3/42
[52] U.S. Cl. .................................... 379/221; 379/45; 379/113; 379/207; 379/266; 379/309
[58] Field of Search ................... 379/37, 45, 201, 265, 379/266, 309, 207, 219, 113, 221, 210, 214

[56] References Cited

U.S. PATENT DOCUMENTS

| | | | |
|---|---|---|---|
| 3,881,060 | 4/1975 | Connell et al. | 179/5.5 |
| 4,611,322 | 9/1986 | Larson et al. | 370/60 |
| 4,689,811 | 8/1987 | Lennstrom et al. | 379/214 X |
| 4,737,983 | 4/1988 | Frauenthal et al. | 379/223 X |
| 5,036,535 | 7/1991 | Gechter et al. | 379/221 |

OTHER PUBLICATIONS

*Rockwell E911 Switching System*, Rockwell International, pub. No. 500-583-602 (1986).
*State of New Jersey 9-1-1 Emergency Number Plan*, Office of Emergency Telecommunications Services, Division of State Police, Department of Law and Public Safety, N.J. (Jan. 1990).
Bell Communications Research, *E911 Public Safety Answering Point: Interface Between a 1/1AESS ™ Switch and Customer Premises Equipment*, Technical Reference TR-TSY-000350, Issue 1, (Nov. 1987).
Notes Accompanying GL: 77-09-171, *Expanded 911 Emergency Service: System Description*, AT&T, (Sep. 26, 1977), pp. 4-5.
*Feature Document, Universal Emergency Service Number 911 Feature, Enhanced 911 Service, 2-Wire No. 1 and No. 1A Electronic Switching Systems*, Bell System Practices, AT&T Co., SPCS Section 231-090-288, Issue 2, (Jan. 1981), pp. 5, 77.
*Transmission and Signaling Design of Enhanced 911 Service Trunks*, AT&T Co. Standard, Section 851-319-100, Issue 1, (Jan. 1981), p. 3.

Primary Examiner—James L. Dwyer
Assistant Examiner—Harry S. Hong
Attorney, Agent, or Firm—David Volejnicek

[57] ABSTRACT

A call-load control arrangement for a first call-answering center, such as an E911 service PSAP, causes calls destined for the first center and not yet routed thereto to be rerouted by a central office from the central office directly to a second, alternate, call-answering center while the first center is in call overload. A function monitors current parameters of call-answering performance of the first center and periodically compares them against predetermined criteria of acceptable call-answering performance to determine whether call overload exists. In the E911 service PSAP, the function automatically closes and opens a switch to activate and deactivate the "night-service" or "trunk make-busy" link to cause the central office respectively to reroute calls away from, or to route calls to, the PSAP.

27 Claims, 3 Drawing Sheets

CALL-LOAD-CONTROL ARRANGEMENT FOR AN EMERGENCY-CALL-ANSWERING CENTER

TECHNICAL FIELD

This invention relates generally to telephony, and relates specifically to the controlling of call-load experienced by a call-answering center.

BACKGROUND OF THE INVENTION

Emergency-call-answering centers, such as E911 call-answering centers, are designed to handle a given traffic load based on the average busiest-hour call volume. Trunk quantities and call-answering staff requirements are determined from this data. If the trunk quantities are increased in the actual installation to provide redundant trunking, or if the required staff is not available to handle the offered load, the center is exposed to a possible overload situation. In addition to this problem, emergency-call-answering centers are typically faced with requirements to answer ninety percent of all emergency calls within approximately two rings while being faced with unpredictable traffic peaks.

The public network provides some overload protection, but only in the event that all trunks leading to the call-answering center are busy. In that case, the network routes additional incoming emergency calls to a pre-designated alternate call-answering center. An administrator of an emergency call-answering center can also manually cause all further calls to be switched by the network to an alternate call-answering center. But this facility is only useful if the primary center is being placed out-of-service. Thus, call-answering centers are faced with the difficult task of handling traffic surges without any facility for dynamic-overload protection.

One known system is understood to have attempted to overcome this problem by means of a call-forward busy/don't answer feature, whereby it reroutes calls, that have been queued up and waiting to be answered by a primary call-answering center for longer than a predetermined time (10 seconds), to an alternate call-answering center. However, this approach has a significant disadvantage, which may have tragic consequences in the case of an emergency call: a call must undergo the 10-second delay of first waiting in the queue of the primary call-answering center before being switched to the alternate call-answering center to be answered. This disadvantage becomes especially acute if the alternate call-answering center is also busy, and the call must be switched to yet-another call-answering center, after now having waited in two queues; the delays are cumulative.

SUMMARY OF THE INVENTION

This invention is directed to solving these and other disadvantages of the prior art. According to the invention, there is provided a call-load control arrangement which automatically periodically determines whether a call is likely to be answered within a predetermined period of time when routed to a primary call-answering center while the primary call-answering center is in service, and signals the determination to a call-routing mechanism which responds to the signaled determination by adjusting the influx of calls to the primary call answering center and thereby controls the call load experienced by the primary call-answering center. Specifically, when the signaled determination indicates that a call routed to the primary call-answering center is likely to be answered within the predetermined period, the call-routing mechanism routes calls that are destined for the primary call-answering center and have not yet been routed to a call-answering center, to the primary call answering center. But when the signaled determination indicates that a call routed to the primary call-answering center is not likely to be answered within the predetermined period, the call-routing mechanism reroutes those calls that are destined for the primary call-answering center and that have not yet been routed to a call-answering center, to an alternate call-answering center. As a consequence, the call-answering center can operate even with reduced agent staff without fear of call overload: the call load is automatically kept to a level manageable by the available number of agents. Furthermore, the call-answering center can now be equipped with spare trunks to improve system availability, reliability, and fault-tolerance, without threatening the call-answering center with call overload from additional calls incoming over the spare trunks. Rather, the spare trunks are kept normally idle, and the call load faced by the call-answering center is automatically kept within acceptable bounds. Yet the call-load control is achieved without transferring calls from queue to queue and delaying them thereby, as is the case in the known art. Rather, the determination of whether the call will likely be answered by a call-answering center in a timely manner is made prior to the routing of the call to that center, and the call is routed accordingly without experiencing delay.

According to an illustrative embodiment of the invention, in an E911 emergency-call-answering center which is equipped with a "night-service" or "trunk make-busy" link to a central office that routes calls to the center, the abovementioned determination of whether a call is or is not likely to be answered within a predetermined period of time is signaled by the center to the central office by automatically activating and deactivating the link, for example by automatically opening and closing a switch placed across the link. An efficient, easy-to-implement, inexpensive, and highly-practical implementation of the call-control arrangement is achieved thereby. This implementation has the further advantage of being conveniently retrofittable into existing E911 call-answering centers.

The E911 call answering center is provided hereby with its own and dynamic control of the existing public network's alternate routing arrangement. By placing control in the answering center, where decisions can be made automatically based on real-time call-handling data (i.e. number of calls in queue, change in average holding time, duration of longest-held call) and current staffing levels, overload protection is enhanced. It also increases the probability that an emergency call-answering center will meet mandated minimum call-answering requirements. In addition, by providing overload-protection control which is based on answering-center performance instead of trunk overload, the answering center can be equipped with fully redundant trunking without being exposed to occasional unmanageable call volumes. Redundant trunking protects the center against service interruption in the event that the primary E911 trunk group is cut or malfunctions.

These and other advantages and features of the invention will become apparent from the following description of an illustrative embodiment of the invention taken together with the drawing.

DETAILED DESCRIPTION

Figure 1:
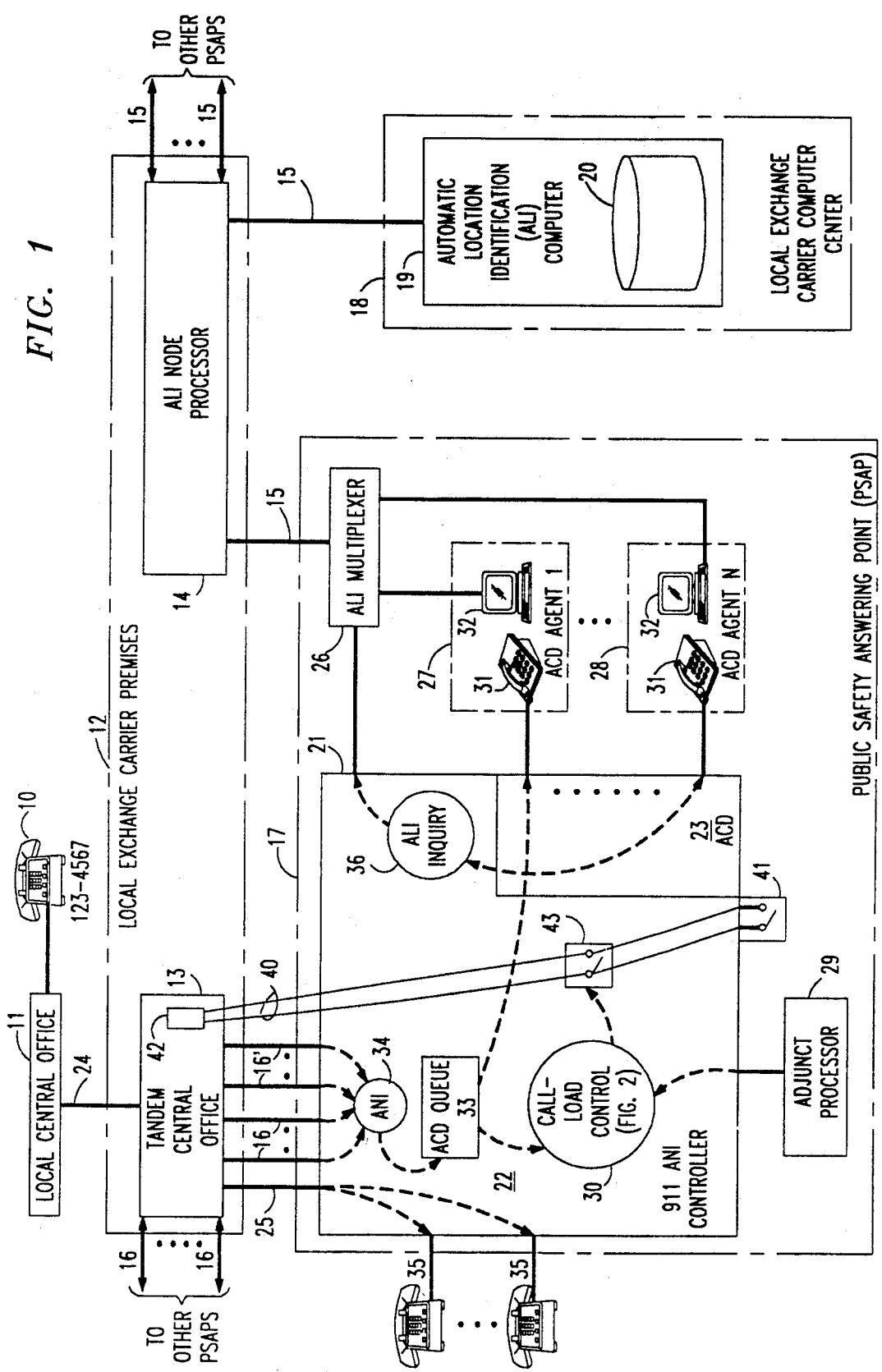
FIG. 1 is a block diagram of an emergency service system including an illustrative embodiment of the invention.

FIG. 1 shows an emergency service system. At the heart of the system is a public safety answering point (PSAP) 17. PSAP 17 is the facility at which emergency telephone calls are answered and the provisioning of emergency services is initiated. The illustrative PSAP 17 shown is an E911 emergency system. Systems of this kind are well known. (See, for example, "E911 Public Safety Answering Point: Interface Between a 1/1A-ESS ™ Switch and Customer Premises Equipment", Technical Reference TR-TSY-000350, Issue 1, November 1987, by Bell Communications Research). PSAP 17 includes a "911" ANI controller 21. Controller 21 is illustratively conventional equipment such as the AT&T ANI controller and display system 22 plus an ACD (Automatic Call Distribution) adjunct 23, such as the one made by Digital Transmission Incorporated. Alternatively, controller 21 is the AT&T System 85/E911 ANI controller 22 running the AT&T ACD software 23. Controller 21 provides private branch exchange (PBX)-type functions for the incoming emergency calls, including call-switching functions provided by element 22 and call-distribution functions to emergency service agents' positions 27-28 provided by element 23. In the latter-mentioned embodiment, wherein controller 21 is based on a PBX such as the AT&T System 85, controller 21 may also be functioning as a conventional PBX and serving non-emergency calls, and a community of users 35 other than agents responsible for handling emergency calls, along with the emergency calls and the emergency call-handling agents. In that case, controller 21 switches received emergency calls (identified as such by the trunks over which they are received at controller 21) to the emergency call-handling agents, and switches other calls to the other users in a conventional PBX-like manner.

Connected to controller 21 is a conventional adjunct processor 29 that provides record-keeping and report-generating functions about the operation of controller 21. Adjunct processor 29 is illustratively the AT&T CMS processor.

PSAP 17 includes a plurality of agent positions 27-28 for answering the emergency calls. Each position 27-28 includes a voice terminal 31, such as a multi-function telephone set, for answering the emergency voice calls, and a display monitoring unit (DMU) 32, such as a data terminal, for displaying data information associated with the call. Each agent position 27-28 is illustratively the AT&T display management system (DMS).

PSAP 17 also includes an automatic location identification (ALI) multiplexer 26 which distributes data information to the proper agent position 27-28. Multiplexer 26 is illustratively the AT&T ALI multiplexer.

PSAP 17 receives emergency calls through a tandem central office 13 located on the premises 12 of a local exchange carrier. Tandem central office 13 is connected by central office trunks 25 and E911 trunks 16 to PSAP 17, as well as to other PSAPs by E911 trunks 16, and by interoffice trunks 24 to telephony local central offices 11, of which one is shown. The local central offices are in turn connected to terminal equipment 10 of telephony service subscribers. The telephone system made up of tandem central office 13 and local central offices 11 provide automatic number identification (ANI): they provide a called party with the telephone number of the calling party.

A local central office 11 which receives a "911" call from subscriber terminal equipment 10 automatically connects the call over a trunk 24 to tandem central office 13 and forwards to office 13 the calling telephone number. Based on the received telephone number, office 13 connects the call over a trunk 16 to one of the PSAPs and forwards to that PSAP the calling telephone number.

Office 13 also connects non-911 calls destined for PSAPs to the appropriate PSAPs over trunks 25. For any PSAP, however, the non-911 calls are connected over trunks 25 which are different from trunks 16 over which the 911 calls are connected.

Assuming that the call comes to PSAP 17, it is received by controller 21. If it is a non-911 call, it is connected by controller 21 to call-destination one of the community of users 35, in a conventional manner. If it is a 911 call, it is stored in a first-in, first-out ACD queue 33 to await the freeing of an agent at one of the positions 27-28 to receive the call. The calling telephone number of the call is captured by an ANI function 34 and is stored in memory along with other information about the call. Calls are retrieved from queue 33 and distributed to positions 27-28 by ACD 23. When ACD 23 assigns a call to a position 27-28, it causes an ALI inquiry function 36 of controller 21 to formulate and send a message to ALI multiplexer 26 requesting information on the calling number. The calling number of the call, and the identification of the position 27-28 to which the call has been assigned, are provided by ACD 23 to ALI inquiry function 36 and are included in the message.

ALI multiplexer 26 is connected by one or more links 15 to an ALI node processor 14. ALI multiplexer 26 forwards the message to ALI node processor 14. ALI node processor 14 is located on premises 12 of the local exchange carrier and is connected by links 15 to PSAP 17 and to other PSAPs 17, and also to an ALI computer 19. ALI node processor 14 acts as a concentrator and deconcentrator, forwarding messages received from the PSAPs to ALI computer 19 and forwarding message responses received from ALI computer 19 to the appropriate PSAPs.

ALI computer 19 is located at a computer center 18 of the local exchange carrier. Center 18 is typically remote from premises 12 and from PSAPs. ALI computer 19 manages a database 20 of information associated with telephone numbers. The associated information includes items of information such as the name and the address of the subscriber to whom the number is assigned, personal data concerning the subscriber that may be of help to emergency service personnel, and the phone numbers of the subscriber's local police, fire, and rescue departments.

In response to receipt of a message requesting the information associated with a telephone number, ALI computer 19 retrieves the information from database 20, formats it into a response message, and sends the response message to ALI node processor 14. Processor 14 in turn sends the response to the appropriate PSAP—the PSAP 17 in this example—where it is received by ALI multiplexer 26 and forwarded to the agent position 27-28 that has been assigned to handle the call. When the agent at the position 27-28 answers the call, the data associated with the call's originating number are displayed on the position's DMU 32.

Tandem central office 13 is also connected to controller 21 of PSAP 17 by a twisted-pair "night-service" link 40, also referred to as a "trunk make-busy" link. Link 40 is conventionally used to indicate to office 13 that PSAP 17 is going out-of-service. At controller 21, link 40 is connected to a manual switch 41. At tandem central office 13, link 40 is functionally connected to a status bit 42 in the memory of office 13. While PSAP 17 is in-service and handling emergency calls, switch 41 is placed in a first (open) position, thereby causing bit 42 to have a first (deactivated) state. When PSAP 17 is placed out-of-service, e.g., it is being shut down for the night, or becomes inoperative, switch 41 is placed in a second (closed) position, thereby causing bit 42 to assume a second (activated) state. Before routing each emergency call destined for PSAP 17, tandem central office 13 checks the state of bit 42. If bit 42 is in the first state, office 13 routes the emergency call to PSAP 17. If bit 42 is in the second state, office 13 reroutes the emergency call to a pre-designated alternate PSAP 17, specified by memory contents of office 13. The state of bit 42 has no effect on emergency calls that already are connected to a PSAP 17 when the state of bit 42 changes. Also, the state of bit 42 has no effect on, and is not checked by office 13 with respect to, non-emergency calls being routed over trunks 25 to terminals 35.

Figure 2:
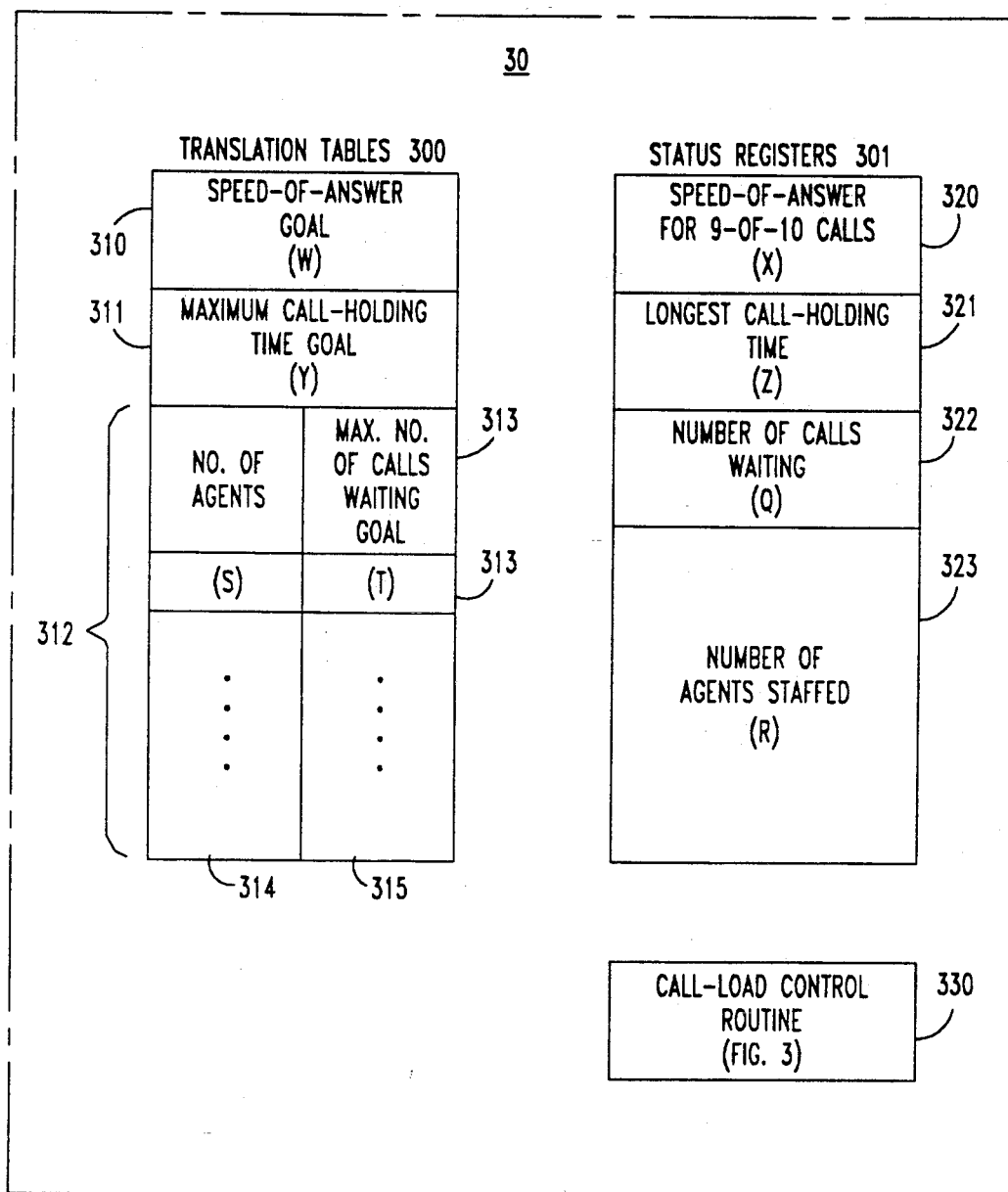
FIG. 2 is a diagram of memory data structures of the call-load control function of the system of FIG. 1.

As described so far, the system of FIG. 1 is conventional. In accordance with the invention, however, there is included in controller 21 a call-load control function 30, and a switch 43 controlled by function 30. Switch 43 is illustratively a software-controlled relay placed in parallel with switch 41 across the twisted-pair leads of link 40. A typical PBX-based controller 21 includes software-operated relays for various purposes such as turning on and off lights, gongs, chimes, etc., and a spare one of these may be used for switch 43. As shown in FIG. 2, function 30 illustratively includes data structures 300 and 301 and a software routine 330, all stored in a memory (not shown) of controller 21. Routine 330 is executed by a processor (not shown) of controller 21 on a periodic basis, e.g., every 100 to 500 milliseconds.

Data structures 300 and 301 serve different purposes. Data structure 300, which is a part of the translation memory tables of controller 21, stores criteria for acceptable call-answering performance of PSAP 17. Data structure 301, which is a part of the status memory registers of controller 21, stores data about the actual current call-answering performance of PSAP 17. The criteria and the data stored in data structures 300 and 301 together constitute parameters of call-answering performance and all have a bearing on the issue of whether a call routed to this PSAP 17 is likely to be answered within an acceptable period of time. Routine 330 operates on the principle of comparing contents of translation tables 300 with the contents of status registers 301 to determine whether the current call-answering performance of PSAP 17 is acceptable, or whether PSAP 17 is approaching overload, and controlling the position (open or closed) of switch 43 accordingly.

Translation tables 300 include a speed-of-answer goal entry 310, which indicates that 90% of all incoming calls should each be answered within (W) seconds of its arrival. Illustratively, (W) is 10 seconds. Time of arrival is illustratively defined as the time when the call enters ACD queue 33. Translation tables 300 also include a maximum call-holding time goal entry 311, which indicates that each incoming call should be answered within (Y) seconds of its arrival. Illustratively, (Y) is 20 seconds. Translation tables 300 further include a table 312 of entries 313 which define the maximum acceptable number of waiting calls in ACD queue 33 for various agent staffing levels. No. of agents field 314 of each entry 313 indicates the number of agents (S), while maximum number of calls waiting goal field 315 of each entry 313 indicates the corresponding acceptable number (T) of calls waiting in queue 33. Illustratively, for values of (S) from 1 to 5, the corresponding values of (T) are 1, 2, 4, 4, and 5, respectively. Contents of translation tables 300 are administrable, and are relatively static and predefined.

Status registers 301 include a speed-of-answer for 9-of-10 calls entry 320, which indicates the number of seconds (X) during which each of the fastest-answered 9 of the preceding 10 answered calls was answered. For example, if one call was answered within 9 seconds, one within 8 seconds, and the remaining 8 calls were answered within less than 7 seconds, entry 320 would indicate 8 seconds. Status registers 301 also include a longest call-holding time entry 321, which indicates the number of seconds (Z) for which the longest-waiting call presently in queue 33 has been waiting therein. Status registers 301 further include a number of calls waiting entry 322, which indicates the total number of calls (Q) that presently are in queue 33. Finally, status registers 301 include a number of agents staffed entry 323, which indicates the total number of agents (R) presently available to answer calls, i.e., the total number of active agent positions 27-28. The contents of status registers 301 are dynamically updated, changed, by controller 21 on the basis of information available from ACD queue 33 and adjunct processor 29.

Figure 3:
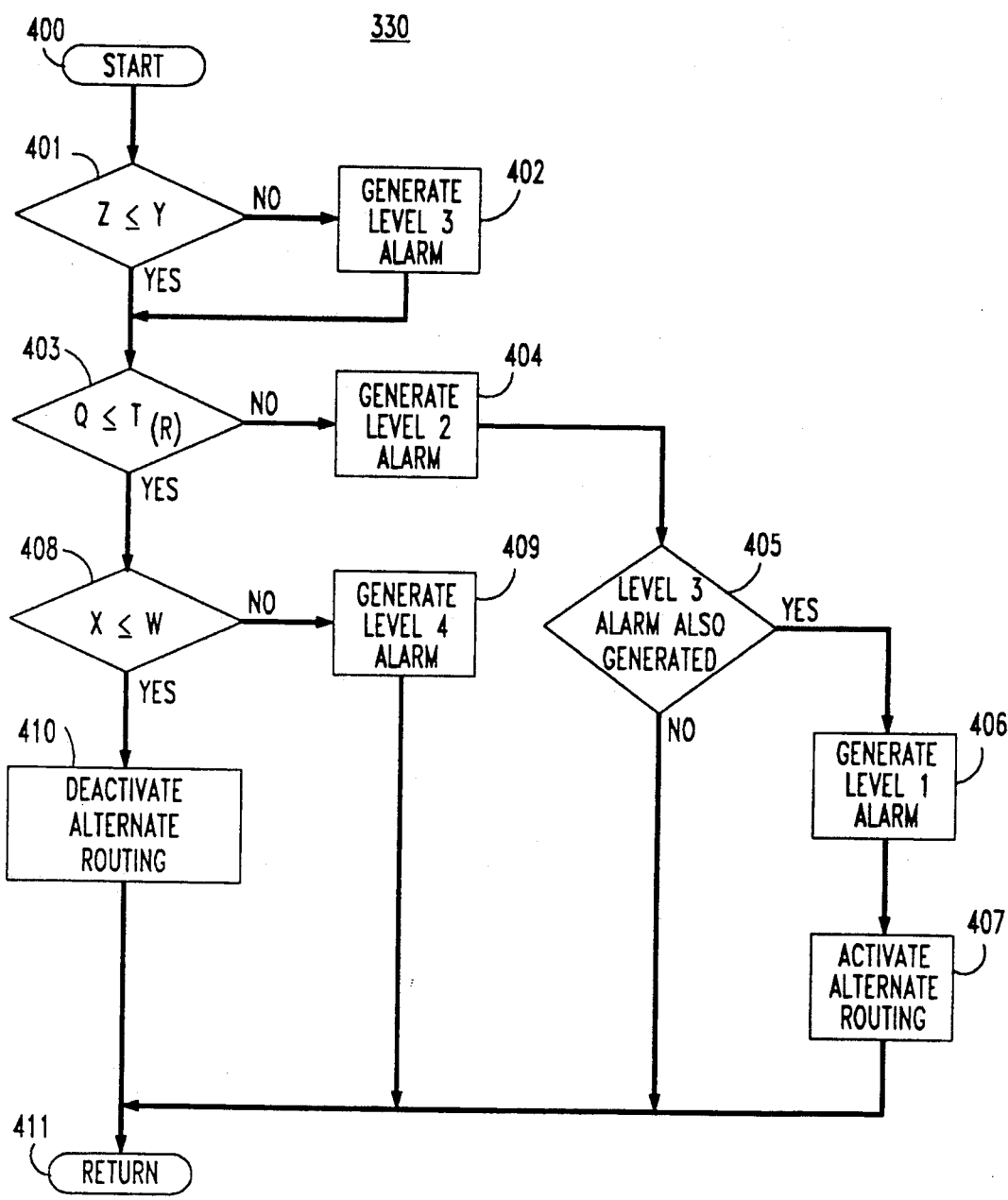
FIG. 3 is a flow diagram of the call-load control routine of the function of FIG. 2.

The structure and functionality of call-load control routine 330 are diagramed in FIG. 3. Upon being invoked, on a periodic basis, at step 400, routine 330 compares the contents of entry 321 with the contents of entry 311, at step 403, to determine whether the presently longest-waiting call in queue 33 has been waiting longer than the maximum allowed time. If the maximum allowed call-waiting time is determined to have been exceeded at step 401, routine 330 generates a level-3 alarm, at step 402. A level-3 alarm is the second-lowest priority, or severity, alarm in a hierarchy of four that is used in this example. Illustratively, a level-3 alarm is a chime, and routine 330 closes a relay to ring the chime.

Following step 401 or 402, routine 330 compares the contents of entry 322 with the contents of that entry 313 which has the contents of entry 323 in its field 314, at step 403, to determine whether the number of calls presently waiting in queue 33 exceeds the number of waiting calls allowed for the number of agent positions which are presently staffed, i.e., number of agents available to answer calls. If the allowed number of waiting calls is exceeded, routine 330 generates a level-2 alarm, at step 404. Illustratively, a level-2 alarm is a gong, and routine 330 closes a relay to strike the gong.

Following step 404, routine 330 checks, at step 405, whether a level-3 alarm was generated at step 402. If so, meaning that both a level-2 and a level-3 alarm were generated, routine 330 generates a level-1 alarm, at step 406. Illustratively, a level-1 alarm is a strobe light, and routine 330 closes a relay to flash the strobe light. Routine 330 also activates alternate routing, at step 407, by ensuring that switch 43 is closed, and closing switch 43 if it is not. While one or both switches 41 and 43 are closed, tandem central office 13 reroutes any further calls, destined for this PSAP 17 and that have not yet been routed to this PSAP 17, from office 13 directly to an alternate PSAP 17. Following step 407, or following step 405 if both a level-2 and a level-3 alarm were not generated, routine 330 returns to the point of its invocation, at step 411.

Returning to step 403, if it was there determined that the allowed number of waiting calls is not exceeded, routine 330 compares the contents of entry 320 with the contents of entry 310, at step 408, to determine whether the goal time for answering 90% of calls is being met. If not, routine 330 generates a level-4 alarm, at step 409, and then returns, at step 411. Illustratively, a level-4 alarm is a lamp, and routine 330 closes a relay to light the lamp. If the goal time for answering 90% of calls is being met, it means that all three criteria of proper PSAP 17 operation are being met, and routine 330 deactivates alternate routing, at step 410, by ensuring that switch 43 is open, and opening switch 43 if it is not open. Routine 330 then returns, at step 411. While both switches 43 and 41 are open, tandem central office 13 routes to this PSAP 17 any calls that are destined for this PSAP and that have not yet been routed to another PSAP 17, and any calls rerouted from another PSAP 17 to this PSAP 17.

Given this mechanism for controlling the call load on PSAP 17, PSAP 17 may now be connected to tandem central office 13 by a set of additional, normally-unused, spare trunks 16' (see FIG. 1), without danger of overloading PSAP 17 with calls. Trunks 16' may be used individually or as a group as substitutes for trunks 16, such as when one or more trunks 16 fail or are otherwise placed out-of-service.

Of course, it should be understood that various changes and modifications may be made to the above-described illustrative embodiment of the invention. For example, the same criteria in different combinations, or other criteria in place or in addition to the described criteria, may be used to determine the presence or absence of call overload. For example, the arrangement may include a time-delay function to smooth out the activation and deactivation of the alternate routing switch function to protect against cyclical peaks in call traffic. Also, the arrangement may include a check on the numbers of callers who are abandoning calls while in queue, as an indication of need to handle calls faster or to route calls to an alternate PSAP. Furthermore, the arrangement may include a check on the rate of arrival of calls, as an indication of impending overload. Such changes and modifications can be made without departing from the spirit and the scope of the invention. It is therefore intended that such changes and modifications be covered by the following claims.

I claim:

1. A call-load control arrangement comprising:
   a primary call-answering center;
   an alternate call-answering center;
   a call-routing node for routing calls to the call-answering centers;
   first means in the primary call-answering center for automatically periodically determining whether a call, routed to the primary call-answering center while the primary call-answering center is in service, is likely to be answered within a predetermined period of time;
   second means in the primary call-answering center, responsive to a determination that the call is unlikely to be answered within the predetermined period of time, for commanding the call-routing node to not route calls to the primary call-answering center; and
   third means in the call-routing node responsive to absence of the command, for routing calls that have not yet been routed to a call-answering center and are destined for the primary call-answering center, to the primary call-answering center, and responsive to the command, for routing the calls that have not yet been routed to a call-answering center and are destined for the primary call-answering center, to the alternate call-answering center.

2. The arrangement of claim 1 wherein the first means comprise
   means for automatically periodically checking parameters of call-answering performance of the primary call-answering center while the primary call-answering center is in service to determine from the parameters whether a call routed to the primary call-answering center is likely to be answered within a predetermined period of time.

3. The arrangement of claim 1 wherein the first means comprise
   means for determining whether a predetermined percentage of calls most recently answered by the primary call-answering center have each been answered within a predetermined first time limit,
   means for determining whether any call waiting to be answered by the primary call-answering center has been waiting longer than a predetermined second time limit, and
   means for determining whether a number of calls waiting to be answered by the primary call-answering center exceeds a predetermined third number limit; and wherein
   the second means command the call-routing node to commence to route the calls to the primary call-answering center, in response to a determination that none of the first, the second, and the third limits have been exceeded, and command the call-routing node to cease to route the calls to the primary call-answering center, in response to a determination that the first and the second limits have both been exceeded; and
   the third means respond to the command to commence by routing the calls to the primary call-answering center, and respond to the command to cease by routing the calls to the alternate call-answering center.

4. The arrangement of claim 1 further comprising:
   at least one first trunk interconnecting the primary call-answering center with the call-routing node and normally used for carrying calls that are routed to the primary call-answering center; and
   at least one spare trunk interconnecting the primary call-answering center with the call-routing node, normally not used and used when the at least one first trunk is out of service for carrying calls that are normally carried by the at least one first trunk.

5. A call-load control arrangement comprising:
   means for routing calls to call-answering centers;

first means in a primary call-answering center for automatically periodically checking parameters of call-answering performance of the primary call-answering center while the primary call-answering center is in service, to determine from the parameters whether a call that has not yet been routed to the primary call-answering center is likely to be answered within a predetermined period of time if it were routed to the primary call-answering center;

second means in the primary call-answering center, responsive to a determination that the call is unlikely to be answered within the predetermined period of time, for commanding the call-routing means to not route calls to the primary call-answering center; and the call-routing means are responsive to absence of the command, for routing calls that have not yet been routed to a call-answering center and are destined for the primary call-answering center, to the primary call-answering, and responsive to the command, for routing the calls that have not yet been routed to a call-answering center and are destined for the primary call-answering center, to an alternate call-answering center.

6. The arrangement of claim 5 wherein the first means comprise means for determining whether a predetermined percentage of calls most recently answered by the primary call-answering center have each been answered within a predetermined first time limit, means for determining whether any call waiting to be answered by the primary call-answering center has been waiting longer than a predetermined second time limit, and means for determining whether a number of calls waiting to be answered by the primary call-answering center exceeds a predetermined third number limit; and wherein the second means command the call-routing means to commence to route the calls to the primary call-answering center, in response to a determination that none of the first, the second, and the third limits have been exceeded, and command the call-routing means to cease to route the calls to the primary call-answering center, in response to a determination that the first and the second limits have both been exceeded; and the call routing means respond to the command to commence by routing the calls to the primary call-answering center, and respond to the command to cease by routing the calls to the alternate call-answering center.

7. The arrangement of claim 5 further comprising:

at least one first trunk extending from the call-routing means to the primary call-answering center and normally used for carrying calls that are routed to the primary call-answering center; and at least one spare trunk extending from the call-routing means to the primary call-answering center, normally not used and used when the at least one first trunk is out of service for carrying calls that are normally carried by the at least one first trunk.

8. An arrangement for controlling a call load of a call-answering center that has a signaling connection to a call-routing node which connection, when activated, causes the routing node to reroute calls destined for the call-answering center to an alternate call-answering center, comprising:

first means in the call-answering center for automatically periodically determining whether a call routed to the center while the center is in service is likely to be answered within a predetermined period of time;

second means in the call-answering center, responsive to each determination by the first means that the call is likely to be answered within the predetermined period of time, for automatically ensuring deactivation of the signaling connection to cause calls that have not yet been routed to the center to be routed to the center; and third means in the call-answering center, responsive to each determination by the first means that the call is likely not to be answered within the predetermined period of time, for automatically ensuring activation of the signaling connection to cause calls that have not yet been routed to the center to be routed to an alternate call-answering center.

9. The arrangement of claim 8 wherein the first means comprise means for automatically periodically checking parameters of call-answering performance of the center while the center is in service to determine from the parameters whether a call routed to the center is likely to be answered within a predetermined period of time.

10. The arrangement of claim 9 for a center that has a queue for calls waiting to be answered by the center, wherein the first means comprise means for determining whether a predetermined percentage of calls most recently answered by the center have each been answered within a predetermined first time limit, means for determining whether any call waiting in the queue has been waiting longer than a predetermined second time limit, and means for determining whether a number of calls waiting in the queue exceeds a predetermined third number limit; wherein the second means ensure deactivation of the signaling connection in response to determinations that none of the first, the second, and the third limits have been exceeded; and wherein the third means ensure activation of the signaling connection in response to determination that the first and the second limits have both been exceeded.

11. The arrangement of claim 8 for a center that has a queue for calls that have been routed to and are waiting to be answered by the center, wherein the signaling connection while active causes calls not yet routed to the center to be routed from the node directly to an alternate call-answering center, and causes calls already routed to the center to remain routed from the node to the center.

12. The arrangement of claim 8 wherein the second means ensure deactivation by maintaining deactivated the signaling connection when it is not active and deactivating the signaling connection when it is active; and the third means ensure activation by maintaining activated the signaling connection when it is active and activating the signaling connection when it is not active.

13. The arrangement of claim 8 for an emergency-call-answering center wherein calls routed to the center are emergency calls.

14. The arrangement of claim 8 for controlling the call load of a call-answering center that further has at least one first trunk interconnecting the call-answering center with the call-routing node normally used for carrying calls that are routed to the call-answering center, further comprising:

at least one spare trunk interconnecting the call-answering center with the call-routing node, normally not used and used when the at least one first trunk is out of service for carrying calls that are normally carried by the at least one first trunk.

15. An arrangement for controlling an emergency-call load of an emergency-call-answering center that has a manually-activateable "night service" or "trunk make-busy" signaling connection to a central-office switch which connection, when activated, places the call-answering center out of service and causes the switch to reroute calls destined for the call-answering center to an alternate call-answering center, comprising:

first means in the emergency-call-answering center for automatically periodically determining whether an emergency call routed to the emergency-call-answering center while the emergency-call-answering center is in service is likely to be answered within a predetermined period of time;

second means in the emergency-call-answering center, responsive to each determination by the first means that the emergency call is likely to be answered within the predetermined period of time, for automatically deactivating the signaling connection if it is activated, to cause emergency calls that have not yet been routed to the emergency-call-answering center to be routed to the emergency-call-answering center; and third means in the emergency-call-answering center, responsive to each determination by the first means that the emergency call is likely not to be answered within the predetermined period of time, for automatically activating the signaling connection if it is deactivated to cause emergency calls that have not yet been routed to the emergency-call-answering center to be routed to an alternate emergency-call-answering center.

16. The arrangement of claim 15 for controlling the emergency-call load of an emergency-call-answering center that further has a plurality of first emergency-call trunks interconnecting the emergency-call-answering center with the central-office switch normally used for carrying emergency calls that are routed to the emergency-call-answering center, further comprising:

at least one spare trunk interconnecting the emergency-call-answering center with the central-office switch, normally not used and used when at least one of the first trunks is out of service for carrying calls that are normally carried by the out-of-service first trunk.

17. A method of controlling the call-load experienced by a call-answering center in a system having a primary call-answering center, an alternate call-answering center, and a call-routing node for routing calls to the call-answering centers, the method comprising the steps of:

automatically periodically determining in the primary call-answering center whether a call routed to the primary call-answering center while the primary call-answering center is in service is likely to be answered within a predetermined period of time;

in response to a determination that the call is unlikely to be answered within the predetermined period of time, commanding the call-routing node from the primary call-answering center to not route calls to the primary call-answering center; and in response to absence of the command, routing calls, that have not yet been routed to a call-answering center and are destined for the primary call-answering center, from the call-routing node to the primary call-answering center; and in response to the command, routing the calls, that have not yet been routed to a call-answering center and are destined for the primary call-answering center, from the call-routing node to the alternate call-answering center.

18. The method of claim 17 wherein the step of determining comprises the step of:

automatically periodically checking parameters of call-answering performance of the primary call-answering center while the primary call-answering center is in service to determine from the parameters whether a call routed to the primary call-answering center is likely to be answered within a predetermined period of time.

19. The method of claim 17 wherein the step of determining comprises the step of determining whether a predetermined percentage of calls most recently answered by the primary call-answering center have each been answered within a predetermined first time limit, determining whether any call waiting to be answered by the primary call-answering center has been waiting longer than a predetermined second time limit, and determining whether a number of calls waiting to be answered by the primary call-answering center exceeds a predetermined third number limit;

the method further comprises the step of commanding the call-routing node to commence to route the calls to the primary call-answering center, in response to a determination that none of the first, the second, and the third limits have been exceeded;

the step of commanding the call-routing node to not route calls to the primary call-answering center comprises the step of commanding the call-routing node to cease to route the calls to the primary call-answering center, in response to a determination that the first and the second limits have both been exceeded;

the step of routing calls to the primary call-answering center comprises the step of in response to the command to commence, routing the calls from the call-routing node to the primary call-answering center; and the step of routing the calls to the alternate call-answering center comprises the step of in response to the command to cease, routing the calls from the call-routing node to the alternate call-answering center.

20. A method of controlling the call-load experienced by a call-answering center, comprising the steps of:

automatically periodically checking parameters of call-answering performance of a primary call-answering center while the primary call-answering center is in service, to determine at the primary call-answering center from the parameters whether a call that has not yet been routed to the primary call-answering center is likely to be answered within a predetermined period of time if it were routed to the primary call-answering center;

in response to a determination that the call is unlikely to be answered within the predetermined period of time, the primary call-answering center commanding a call-routing arrangement for routing calls to call-answering centers to not route calls to the primary call-answering center;

in response to absence of the command, the call-routing arrangement routing calls that have not yet been routed to a call-answering center and are destined for the primary call-answering center, to the primary call-answering center; and in response to the command, the call-routing arrangement routing the calls that have not yet been routed to a call-answering center and are destined for the primary call-answering center, to an alternate call-answering center.

21. The method of claim 20 wherein the step of checking parameters comprises the steps of determining whether a predetermined percentage of calls most recently answered by the primary call-answering center have each been answered within a predetermined first time limit, determining whether any call waiting to be answered by the primary call-answering center has been waiting longer than a predetermined second time limit, and determining whether a number of calls waiting to be answered by the primary call-answering center exceeds a predetermined third number limit;

the method further comprises the step of commanding the call-routing arrangement to commence to route the calls to the primary call-answering center, in response to a determination that none of the first, the second, and the third limits have been exceeded;

the step of commanding the call-routing arrangement to not route calls to the primary call-answering center includes the step of commanding the call-routing arrangement to cease to route the calls to the primary call-answering center, in response to a determination that the first and the second limits have both been exceeded;

the step of routing calls to the primary call-answering center comprises the step of in response to the command to commence, the call-routing arrangement routing the calls to the primary call-answering center; and the step of routing the calls to the alternate call-answering center comprises the step of in response to the command to cease, the call-routing arrangement routing the calls to the alternate call-answering center.

22. A method of controlling a call load of a call-answering center that has a signaling connection to a call-routing node which connection, when activated, causes the routing node to reroute calls destined for the call-answering center to an alternate call-answering center, comprising the steps of:

automatically periodically determining in the call-answering center whether a call routed to the center while the center is in service is likely to be answered within a predetermined period of time, automatically ensuring deactivation in the call-answering center of the signaling connection to cause calls that have not yet been routed to the center to be routed to the center, in response to each determination that the call is likely to be answered within the predetermined period of time; and automatically ensuring activation in the call-answering center of the signaling connection to cause calls that have not yet been routed to the center to be routed to an alternate call-answering center, in response to each determination that the call is not likely to be answered within the predetermined period of time.

23. The method of claim 22 wherein the step of determining comprises the step of:

automatically periodically checking parameters of call-answering performance of the center while the center is in service to determine from the parameters whether a call routed to the center is likely to be answered within a predetermined period of time.

24. The method of claim 22 for a center that has a queue for calls waiting to be answered by the center, wherein the step of determining comprises the steps of determining whether a predetermined percentage of calls most recently answered by the center have each been answered within a predetermined first time limit, determining whether any call waiting in the queue has been waiting longer than a predetermined second time limit, and determining whether a number of calls waiting in the queue exceeds a predetermined third number limit;

the step of ensuring deactivation of the signaling connection is performed in response to determinations that none of the first, the second, and the third limits have been exceeded; and the step of ensuring activation of the signaling connection is performed in response to determinations that the first and the second limits have both been exceeded.

25. The method of claim 22 for a center that has a queue for calls that have been routed to and are waiting to be answered by the center, wherein the signaling connection while active causes calls not yet routed to the center to be routed from the node directly to an alternate call-answering center, and causes calls already routed to the center to remain routed from the node to the center.

26. The method of claim 22 wherein the step of ensuring deactivation comprises the steps of maintaining deactivated the signaling connection when it is not active, and deactivating the signaling connection when it is active; and the step of ensuring activation comprises the steps of maintaining activated the signaling connection when it is active, and activating the signaling connection when it is not active.

27. The method of claim 22 for an emergency-call-answering center wherein calls routed to the center are emergency calls.

* * * * *